United States Patent
Chang et al.

(10) Patent No.: US 10,642,260 B2
(45) Date of Patent: May 5, 2020

(54) EARLY WARNING SYSTEM CAPABLE OF SENDING WARNING SIGNAL ACCORDING TO MONITOR DATA

(71) Applicant: TCC INFORMATION SYSTEMS CORP., Taipei (TW)

(72) Inventors: Chien-Chih Chang, Taipei (TW); Chun-Cheng Yu, Taipei (TW); Chao-Shih Chang, New Taipei (TW)

(73) Assignee: TCC INFORMATION SYSTEMS CORP., Taipei (TW)

( * ) Notice: Subject to any disclaimer, the term of this patent is extended or adjusted under 35 U.S.C. 154(b) by 287 days.

(21) Appl. No.: 15/641,245

(22) Filed: Jul. 4, 2017

(65) Prior Publication Data

US 2018/0275644 A1 Sep. 27, 2018

(30) Foreign Application Priority Data

Mar. 27, 2017 (TW) .............................. 106110112 A (51) Int. Cl.
G05B 23/02 (2006.01)
G05D 23/19 (2006.01)
F27B 7/20 (2006.01)
F27B 7/42 (2006.01)

(52) U.S. Cl.
CPC .............. *G05B 23/027* (2013.01); *F27B 7/20* (2013.01); *F27B 7/42* (2013.01); *G05B 23/024* (2013.01); *G05B 23/0272* (2013.01); *G05D 23/1917* (2013.01)

(58) Field of Classification Search
None
See application file for complete search history.

(56) References Cited

U.S. PATENT DOCUMENTS

2014/0145849 A1  5/2014  Huang

FOREIGN PATENT DOCUMENTS

| CN | 1566911 A | | 1/2005 |
|----|-----------|---|--------|
| CN | 101349904 A | | 1/2009 |
| CN | 101349904 B | * | 7/2011 |
| CN | 103746829 A | | 4/2014 |

(Continued)

OTHER PUBLICATIONS

English translation of Nakao (JP 2012-98253) (Year: 2012).*
(Continued)

*Primary Examiner* — Kathryn Wright
(74) *Attorney, Agent, or Firm* — Winston Hsu (57) ABSTRACT

An early warning system includes functional equipment, a first monitor unit, a second monitor unit, a calculation unit and a warning unit. The functional equipment is used to perform a functional operation. The first monitor unit is used to monitor the functional equipment so as to obtain a set of first data during a first period. The second monitor unit is used to monitor the functional equipment to obtain a set of second data during the first period. The calculation unit is used to receive the set of first data and the set of second data, obtain a correlation coefficient according to the set of first data and the set of second data, and compare the correlation coefficient with a threshold value. The warning unit is linked to the calculation unit and used to send a warning signal when at least the correlation coefficient reaches the threshold value.

8 Claims, 9 Drawing Sheets

(56) References Cited

FOREIGN PATENT DOCUMENTS

| | | | |
|---|---|---|---|
| CN | 103914889 A | | 7/2014 |
| CN | 104937802 A | | 9/2015 |
| CN | 105042599 A | | 11/2015 |
| CN | 205201433 U | * | 5/2016 |
| CN | 206037693 U | | 3/2017 |
| JP | 2012098253 A | * | 5/2012 |

OTHER PUBLICATIONS

English translation of Xiuqin et al., (CN 205201433) (Year: 2016).*
Machine-generated English translation of CN 103914889, 2014, pp. 1-6.*

* cited by examiner

EARLY WARNING SYSTEM CAPABLE OF SENDING WARNING SIGNAL ACCORDING TO MONITOR DATA

BACKGROUND OF THE INVENTION

1. Field of the Invention

The present invention is related to an early warning system, and in particular, an early warning system capable of sending a warning signal according to monitor data.

2. Description of the Prior Art

In engineering, monitor device is often used for monitoring functional equipment. In cement production, a cement rotary kiln is widely used for heating cement material to generate necessary chemical compounds. In the cement rotary kiln, a mixture of calcium carbonate and silica-bearing minerals can be heated to generate calcium silicate compounds needed for generating cement. When operating a cement rotary kiln, a thermometer may be used to monitor the temperature of a roller of the cement rotary kiln. When the measured temperature is higher than a threshold, it indicates that the kiln has entered to an abnormal status, and the kiln needs to be thoroughly checked. However in practice, a cement rotary kiln may already be out of order when the temperature measured by a single thermometer is still below the threshold.

SUMMARY OF THE INVENTION

An embodiment provides an early warning system including functional equipment, a first monitor unit, a second monitor unit, a calculation unit and a warning unit. The functional equipment is used to perform a functional operation. The first monitor unit is used to monitor the functional equipment so as to obtain a first set of data during a period. The second monitor unit is used to monitor the functional equipment so as to obtain a second set of data during the period. The calculation unit is linked to the first monitor unit and the second monitor unit and used to receive at least the first set of data and the second set of data, obtain a first correlation coefficient according to the first set of data and the second set of data, and compare the first correlation coefficient with a first threshold value. The warning unit is linked to the calculation unit and used to send a warning signal when at least the first correlation coefficient reaches the first threshold value.

Another embodiment includes a method for controlling an early warning system. The early warning system includes functional equipment, a first monitor unit, a second monitor unit, a calculation unit and a warning unit. The method includes the functional equipment performing a functional operation; the first monitor unit monitoring the functional equipment so as to obtain a first set of data during a first period; the second monitor unit monitoring the functional equipment so as to obtain a second set of data during the first period; the calculation unit obtaining a first correlation coefficient according to the first set of data and the second set of data, and comparing the first correlation coefficient with a first threshold value; and the warning unit sending a warning signal when the first correlation coefficient reaches a first threshold value.

Yet another embodiment provides a method for controlling an early warning system. The early warning system includes functional equipment, a first monitor unit, a second monitor unit, a calculation unit and a warning unit. The method includes the functional equipment performing a functional operation; the first monitor unit monitoring the functional equipment so as to obtain a first set of data during a period; the second monitor unit monitoring the functional equipment so as to obtain a second set of data during the period; the calculation unit obtaining a first correlation coefficient according to the first set of data and the second set of data, and comparing the first correlation coefficient with a first threshold value; the first monitor unit monitoring the functional equipment so as to obtain a third set of data during a second period; the second monitor unit monitoring the functional equipment so as to obtain a fourth set of data during the second period; the calculation unit obtaining a second correlation coefficient according to the third set of data and the fourth set of data, and comparing the second correlation coefficient with a second threshold value; and the warning unit sending the warning signal when the first correlation coefficient reaches the first threshold value and the second correlation coefficient reaches the second threshold value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
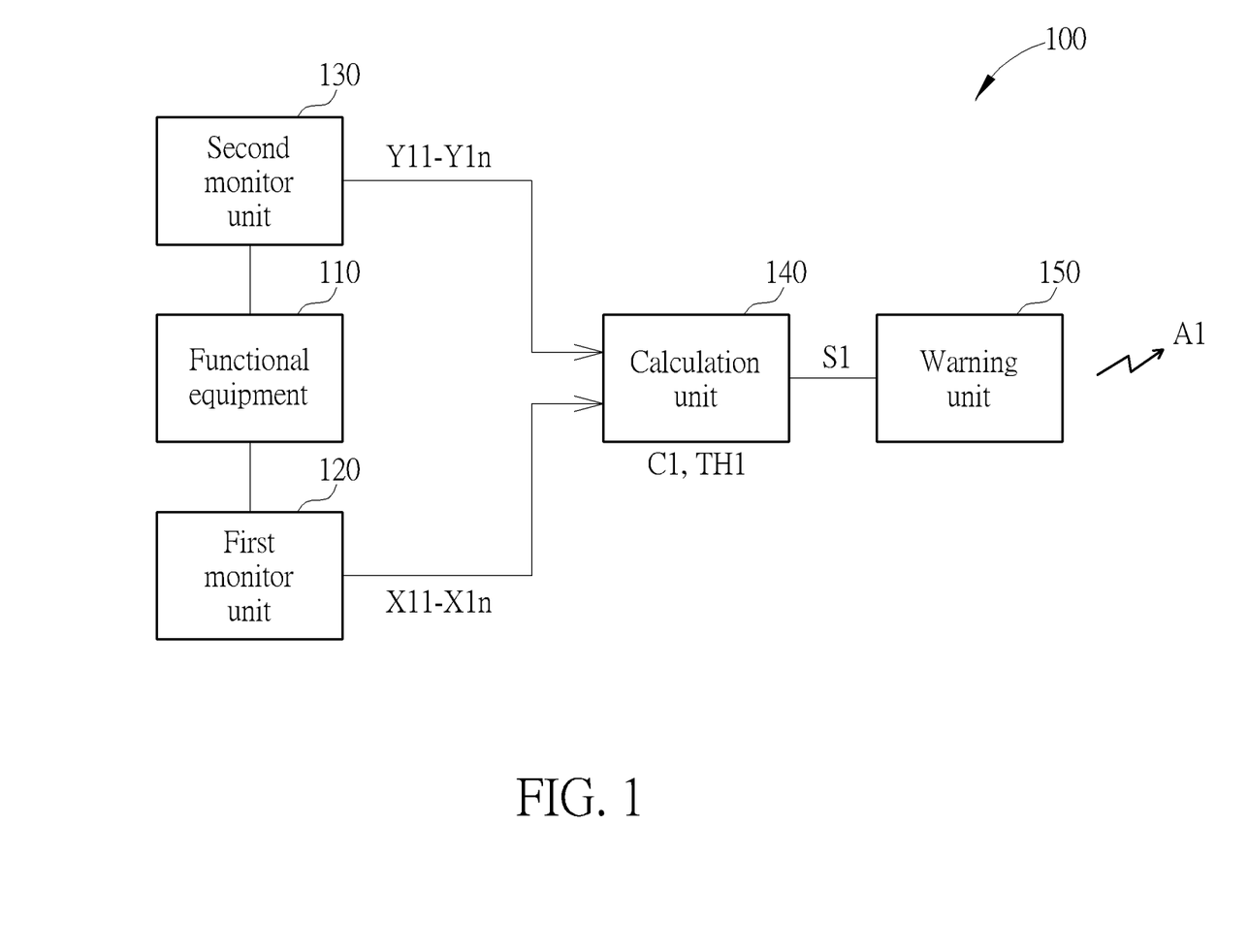
FIG. 1 illustrates an early warning system according to an embodiment.

FIG. 1 illustrates an early warning system 100 according to an embodiment. The early warning system 100 may include functional equipment 110, a first monitor unit 120, a second monitor unit 130, a calculation unit 140 and a warning unit 150. The functional equipment 110 is used to perform a specific functional operation. The first monitor unit 120 is used to monitor the functional equipment 110 so as to obtain a first set of data $X11$-$X1n$ during a first period T1. The second monitor unit 130 is used to monitor the functional equipment 110 so as to obtain a second set of data $Y11$-$Y1n$ during the first period T1. The calculation unit 140 is linked to the first monitor unit 120 and the second monitor unit 130 via a wired path and/or a wireless path so as to receive at least the first set of data $X11$-$X1n$ and the second set of data $Y1$-$Yn$. The calculation unit 140 may obtain a first correlation coefficient C1 according to the first set of data X11-X1n and the second set of data Y11-Y1n and compare the first correlation coefficient C1 with a first threshold value TH1. When the first correlation coefficient C1 reaches the first threshold value TH1, the warning unit 140 may send a control signal S1 to the warning unit 150. The warning unit 150 may be linked to the calculation unit 140 and used to send a warning signal A1 when the first correlation coefficient C1 reaches the first threshold value TH1. The parameter n is a positive integer, and 1<n.

Figure 2:
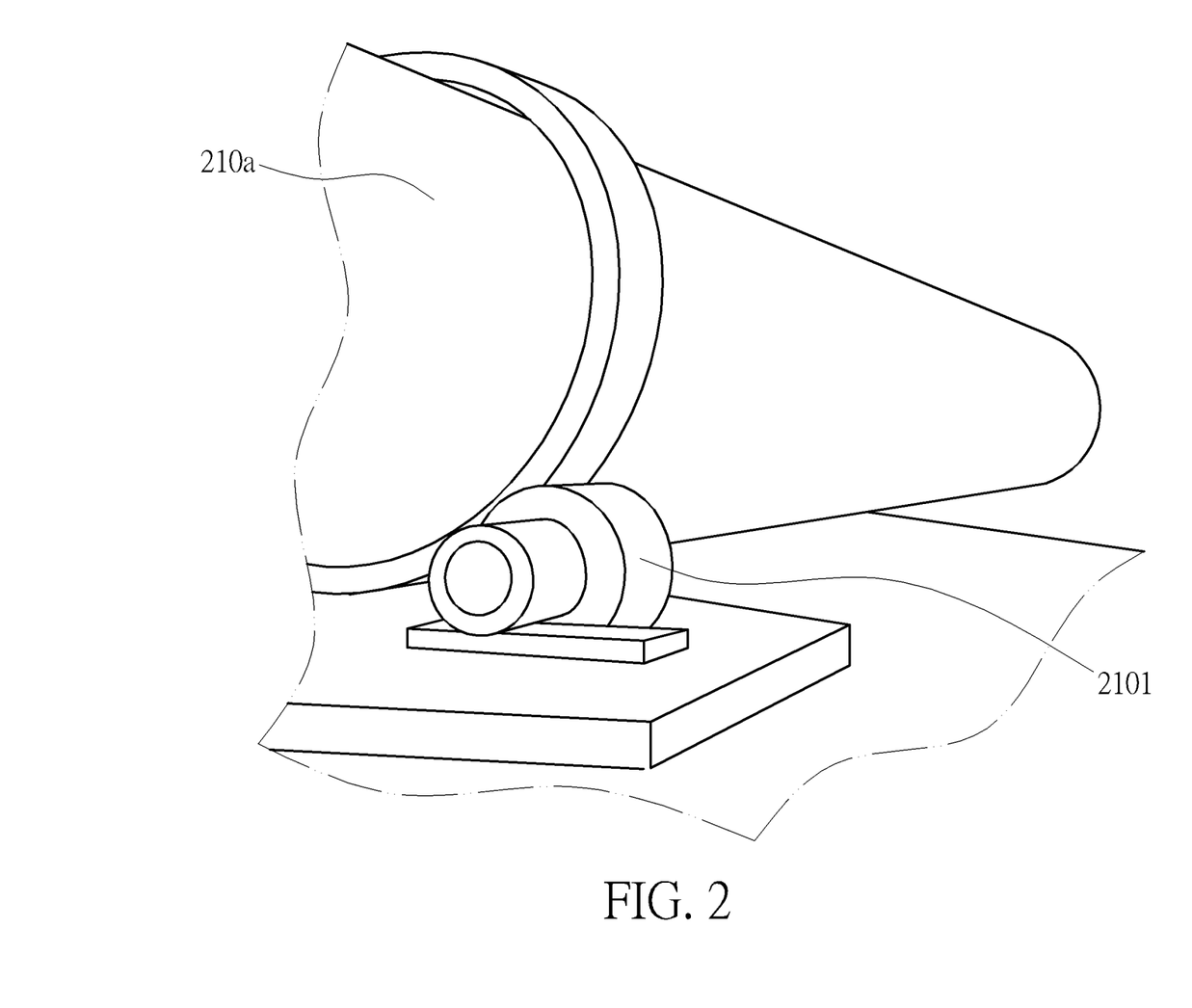
FIG. 2 illustrates equipment of a cement rotary kiln in an embodiment.
Figure 3:
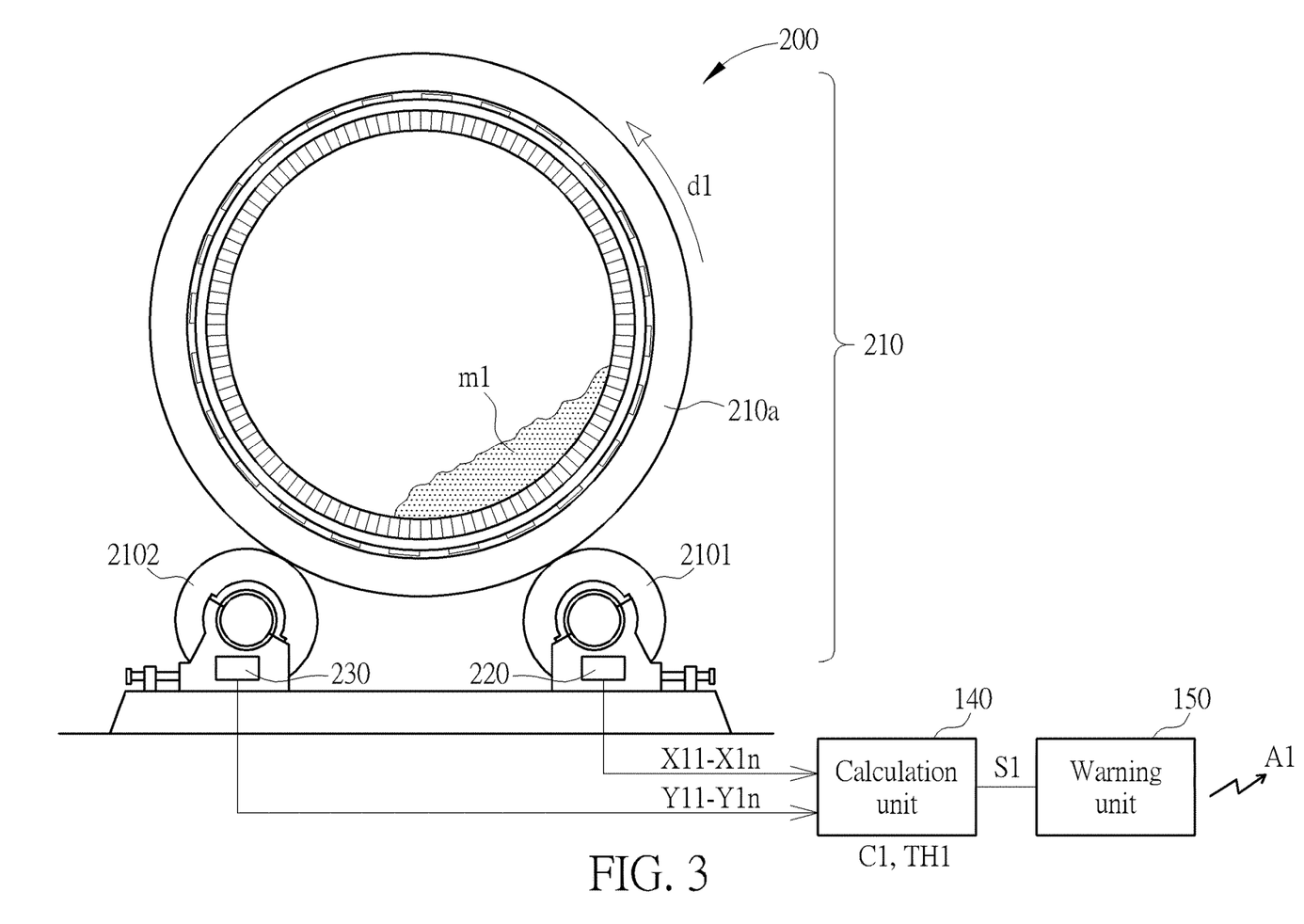
FIG. 3 illustrates an early warning system applied on the cement rotary kiln according to an embodiment.

FIG. 2 illustrates equipment of a cement rotary kiln 210 in an embodiment. FIG. 3 illustrates an early warning system 200 applied on the cement rotary kiln 210 according to an embodiment. FIG. 3 may show a cross-section of the cement rotary kiln 210. As shown in FIGS. 2-3, the cement rotary kiln 210 may include a kiln tube 210a, rotary rolls 2101 and 2102. The rotary rolls 2101 and 2102 may be paired rotary rolls used for supporting the kiln tube 210a. The rotary rolls 2101 and 2102 may rotate so as to rotate the kiln tube 210a along the direction d1 to mix the cement material ml evenly. The cement rotary kiln 210 may perform its functional operation (i.e. heating the mixture of the cement material ml evenly) better. Since the kiln tube 210a may be a long tube as shown in FIG. 2, the cement rotary kiln 210 may include a plurality of pairs of rotary rollers. For example, a pair of rotary rollers may be disposed at each of the front part, the middle part and the rear part of the cement rotary kiln 210 so that a total of six rotary rollers may be disposed. In another embodiment, six pairs of (i.e. twelve) rotary rollers may be used. In order to explain the operation of an embodiment, merely one pair of rotary rollers (i.e. the rotary rollers 2101-2102) is taken as an example here. In FIG. 3, the first monitor unit 120 may be a first temperature measurement unit 220 used to measure the temperature of the rotary roller 2101. The second monitor unit 130 may be a second temperature measurement unit 230 used to measure the temperature of the rotary roller 2102. For example, if the foresaid first period T1 is n days, and the measurement is performed once daily, the first temperature measurement unit 220 may obtain the first set of data X11-X1n including n pieces of temperature data. The first set of data X11-X1n may be a first set of temperature data. Similarly, the second temperature measurement unit 230 may obtain the second set of data Y11-Y1n including n pieces of temperature data. The second set of data Y11-Y1n may be a second set of temperature data.

The calculation unit 140 may be a server including a specific calculation module or expert diagnosis system (EDS) formed by integrating hardware and software. The calculation module may be used to receive and analyze the foresaid temperature data X11-X1n and Y11-Y1n to generate the correlation coefficient C1. The warning unit 150 may include a display interface (e.g. a display screen, a designed user interface (UI)) and/or a speaker. The warning signal may include a visual signal (e.g. indication light or a change of a curve diagram) and/or a voice signal (e.g. warning sound).

The generation of the correlation coefficient C1 according to the first set of data X11-X1n and the second set of data Y11-Y1n may be performed as the following equation eq 1:

$$C1 = f(X11, \ldots, X1n, Y11, \ldots, Y1n) \quad (\text{eq 1}).$$

In the equation eq 1, f( ) may be a function.
According to an embodiment, the equation eq 1 may be expressed as equation eq 2.

$$C1 = \frac{\sum_{i=1}^{n}(X1i - \overline{X1}) \cdot (Y1i - \overline{Y1})}{\sqrt{\sum_{i=1}^{n}(X1i - \overline{X1})^2 \cdot \sum_{i=1}^{n}(Y1i - \overline{Y1})^2}}. \quad (\text{eq2})$$

The variable $X1i$ may be one of the data X11 to X1n. $\overline{X1}$ may be a mean value of the data X11 to X1n. The variable $Y1i$ may be one of the data Y11 to Y1n. $\overline{Y1}$ may be a mean value of the data Y11 to Y1n. The parameter i may be a positive integer, and $1 \leq i \leq n$. With regard to the correlation coefficient C1 generated by calculation, an inequality $-1 \leq C1 \leq 1$ may be concluded. When the positive correlation between the first set of data X11-X1n and the second set of data Y11-Y1n is higher, the correlation coefficient C1 is closer to 1. When the negative correlation between the first set of data X11-X1n and the second set of data Y11-Y1n is higher, the correlation coefficient C1 is closer to −1. When the correlation coefficient C1 is closer to 0, the correlation between the data X11-X1n and the data Y11-Y1n is lower.

Figure 4:
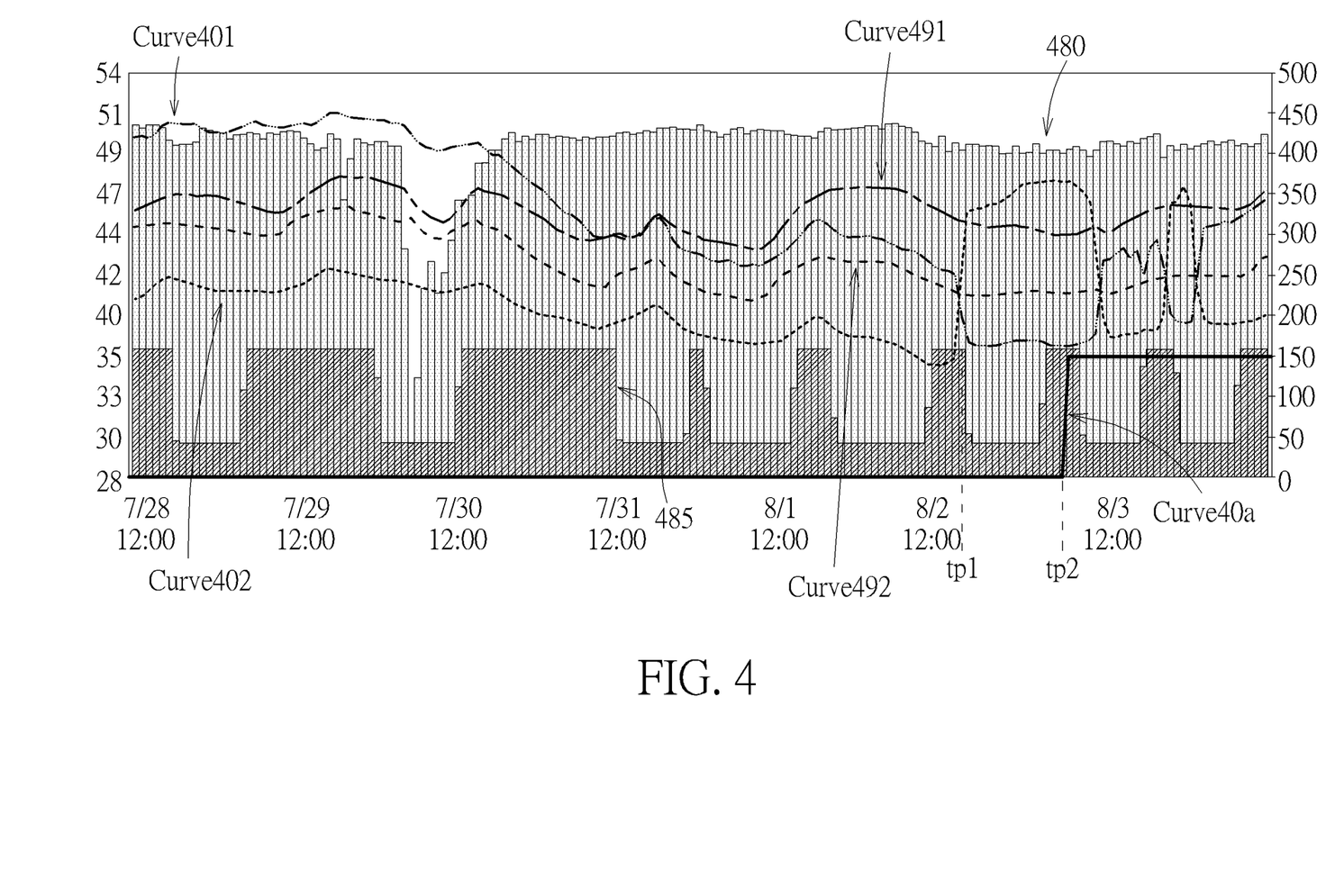
FIG. 4 illustrates a curve diagram of the temperature data according to an embodiment.

In the example of the rotary cement kiln 210 of FIGS. 2-3, when the temperature measured by any of the temperature measurement units 220 and 230 is too high such as over 80° C. (degrees centigrade), it means that the rotary roller may be overheated. For example, if the rotary roller 2101 of FIG. 3 is damaged by overheating, and the rotary roller 2102 keeps rotating, the kiln tube 210a may overturn so that the production line has to shut down to be fixed. Hence, when any of the temperature measurement units measures an excessive temperature, the calculation unit 140 may control the warning unit 150 to send a warning signal. However, in practice, the kiln tube 210a could still overturn when none of the temperature measurement units observe an excessive temperature. After analyzing the collected data, the cause may correspond to the abnormal distribution of the correlation of the temperatures of the rotary rollers 2101-2102 although the measured temperatures are still not too high. FIG. 4 illustrates a curve diagram of the temperature data according to an embodiment. As shown in FIGS. 3-4, the horizontal axis of FIG. 4 may correspond to time, and the vertical axis may correspond to temperature. The curve 401 may be a curve obtained according to the temperature data measured on the rotary roller 2101 by the first temperature measurement unit 220. The curve 402 may be a curve obtained according to the temperature data measured on the rotary roller 2102 by the second temperature measurement unit 230. Since the rotary rollers 2102-2103 are of a pair of rotary rollers disposed in corresponding positions, the force on the rotary rollers 2102-2103 should be balanced substantially. Hence, in ideal, the variation of the temperatures of the rotary rollers 2102-2103 is supposed to be positively correlated. For example, the temperatures of the rotary rollers 2102-2103 are supposed to increase or decrease synchronously. As shown FIG. 4, before the time point tp1, the curves 401 and 402 may rise and fall in sync approximately, hence this may be a normal condition. However, around the time point tp1, low correlation between the curves 401 and 402 may be observed since the two curves fail to vary synchronously. Hence, the low correlation may be interpreted as that the forces on the rotary rollers 2101 and 2102 are uneven. Though the temperatures are not overhigh, when the correlation is too low, a warning signal may be sent to inform a user to notice the abnormal condition before a mechanical breakdown. As shown in FIG.

4, the changing of the curve 40a from a low level to a high level corresponds to the foresaid warning signal A1. The calculation unit 140 may determine that the correlation between the curves 401 and 402 is too low so as to change the curve 40a from the low level to the high level at the time point tp2. The curves 491 and 492 may be temperature curves of another pair of rotary rollers (not shown in FIG. 3). Compared with the curves 401 and 402, the curves 491 and 492 may be more ideal since the curves 491 and 492 vary in sync substantially.

In FIG. 4, two statistical bar charts 480 and 485 are shown. The statistical bar chart 480 may correspond to the material quantity fed into the kiln tube 210a. The bar chart 485 may correspond to an upward movement and a downward movement of the kiln tube 210a shown in FIG. 2 and FIG. 3. The kiln tube 210a may be a long tilted tube having two terminals with different heights. Hence, when the kiln tube 210a moves upward, the kiln tube 210a may move toward the higher terminal. On the contrary, when the kiln tube 210a moves downward, the kiln tube 210a may move toward the lower terminal. The cement material m1 in the kiln tube 210a may be mixed more evenly with the upward movement and the downward movement of the kiln tube 210a. In FIG. 4, the bar charts 480 and 485 are shown for a user to analyze and determine whether the rise of the curve 40a (corresponding to sending the warning signal A1) relates to the material quantity fed into the kiln tube 210a, and/or the upward/downward movement of the kiln tube 210a. The bar charts 480 and 485 are shown according to an embodiment instead of limiting the scope of the present invention.

According to an embodiment, when the correlation coefficient C1 is lower than a threshold value TH1, the warning unit 150 may send the warning signal A1. For example, the curve 40a may turn from a low level to a high level on a user interface on a display. However, two correlation coefficients of two different periods may be considered so as to determine whether the warming signal A1 is sent conditionally for reducing false alarms.

Figure 5:
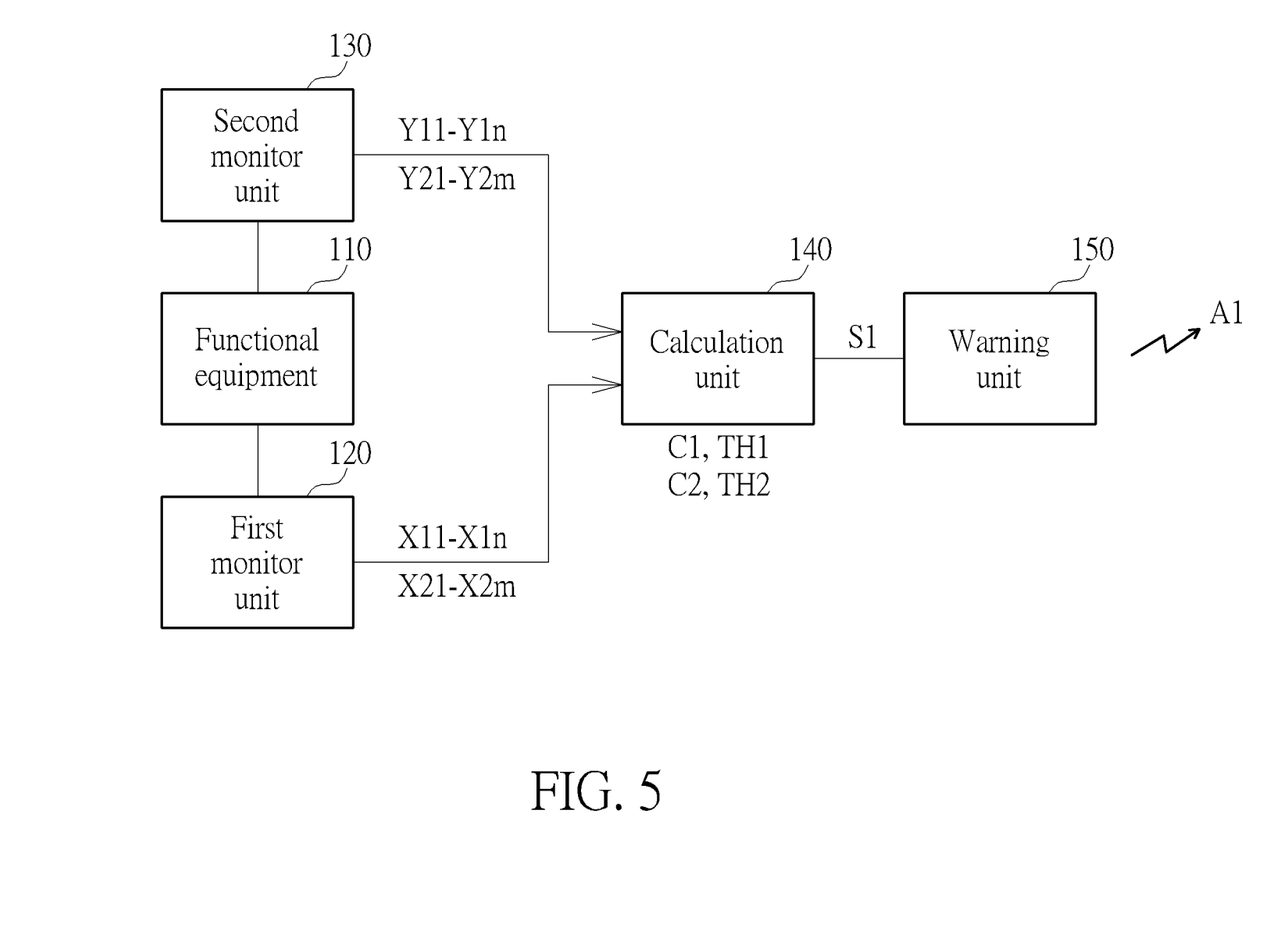
FIG. 5 illustrates the early warning system according to another embodiment.

For example, if a first period T1 is seven days, the correlation coefficient C1 obtained by the foresaid equation eq 2 may correspond to the correlation between the temperatures of the rotary rollers 2101 and 2102 during the last seven days since the present time point. However, if the correlation coefficient C1 is lower than the threshold value TH1, but the rotary rollers 2101 and 2102 have just been checked and maintained completely one day ago, or the forces on the rotary rollers 2101 and 2102 have been adjusted well to be even again by some means, the two rotary rollers may operate normally without being shut down and checked. For filtering out these sorts of unnecessary alarm, the example of FIG. 5 may be referred to. FIG. 5 illustrates the early warning system 100 according to another embodiment. In FIG. 5, the first set of data X11-X1n and the second set of data Y11-Y1n may be measured during the first period T1. During another period T2, the first monitor unit 120 may obtain a third set of data X21-X2m, and the second monitor unit 130 may obtain a fourth set of data Y21-Y2m. The calculation unit 140 may further receive the third set of data X21-X2m and the fourth set of data Y21-Y2m so as to obtain a second correlation coefficient C2 accordingly, and compared the second correlation coefficient C2 with a second threshold value TH2. The warning unit 150 may send the warning signal A1 when the first correlation coefficient C1 reaches the first threshold value TH1 and the second correlation coefficient C2 reaches the second threshold value TH2. Similar to the foresaid equation eq 1, the second correlation coefficient C2 may be calculated by means of the equation eq 3.

$$C2 = g(X21, \ldots, X2m, \ldots, Y21, \ldots, Y2m) \qquad \text{(eq 3)}.$$

Similar to the equation eq 2, the equation eq 3 may be (but not limited to) expressed as equation eq 4:

$$C2 = \frac{\sum_{j=1}^{m}(X2j - \overline{X2}) \cdot (Y2j - \overline{Y2})}{\sqrt{\sum_{j=1}^{m}(X2j - \overline{X2})^2 \cdot \sum_{j=1}^{m}(Y2j - \overline{Y2})^2}}. \qquad \text{(eq4)}$$

The variable X2j may be one of the data X21 to X2m. $\overline{X2}$ may be a mean value of the data X21 to X2m. The variable Y2j may be one of the data Y21 to Y2m. $\overline{Y2}$ may be a mean value of the data Y21 to Y2m. The parameter j may be a positive integer, and 1≤j≤n. With regard to the correlation coefficient C1 generated by calculation, an inequality −1≤C2≤1 may be concluded. When the positive correlation between the third set of data X21-X2m and the fourth set of data Y21-Y2m is higher, the correlation coefficient C2 is closer to 1. When the negative correlation between the third set of data X21-X2m and the fourth set of data Y21-Y2m is higher, the correlation coefficient C2 is closer to −1. When the correlation coefficient C2 is closer to 0, the correlation between the data X21-X2m and the data Y21-Y2m is lower. According to the foresaid equations eq 2 and eq 4, the functions g( ) and f( ) are similar. However, the scope of the present invention is not limited to the exemplified equations. For example, regarding the correlation coefficient C1, if the correlation coefficient C1 is a positive value, the first set of data X11-X1n and the second set of data Y11-Y1n are in a positive correlation. If the correlation coefficient C1 is 0, no correlation is between the first set of data X11-X1n and the second set of data Y11-Y1n. If the correlation coefficient C1 is a negative value, the first set of data X11-X1n and the second set of data Y11-Y1n are in a negative correlation, and the values of the second set of data Y11-Y1n may be smaller when the values of the first set of data X11-X1n are larger. Similarly, the correlation between the third set of data X21-X2m and the fourth set of data Y21-Y2m may correspond to that the second correlation coefficient C2 is a positive value or a negative value.

For example, if the first period T1 is seven days, the measurement is performed once daily during the first period T1, the second period T2 is 24 hours, and the measurement is performed once every three hours during the first period T2, the data shown in FIG. 5 may be as shown in Table 1.

TABLE 1

| Data | First set of data X11-X1n | Second set of data Y11-Y1n | Third set of data X21-X2m | Fourth set of data Y21-Y2m |
|---|---|---|---|---|
| Data in the example | 7 data X11-X17 measured during the period T1 | 7 data Y11-Y17 measured during the period T1 | 8 data X21-X28 measured during the period T2 | 8 data Y21-Y28 measured during the period T2 |
| The correlation coefficient obtained and | | The correlation coefficient C1 is obtained using the data X11-X17 and the data | | The correlation coefficient C2 is obtained using the data X21-X28 and the data |

TABLE 1-continued

| Data | First set of data X11-X1n | Second set of data Y11-Y1n | Third set of data X21-X2m | Fourth set of data Y21-Y2m |
|---|---|---|---|---|
| the comparison with the threshold value | | Y11-Y17, and compared with the threshold value TH1. | | Y21-Y28, and compared with the threshold value TH2. |

In the example of Table 1, n=7 and m=8. The parameters are merely examples rather than limiting the scope of the present invention. In the embodiment, C1≤TH1 and C2≤TH2 may be used as a condition for sending the warning signal A1. According to another embodiment, it is reasonable to replace the sign "≤" ("less than or equal to") with the sign "<" ("less than") according to a boundary condition determined by a researcher. The sign "≤" ("less than or equal to") is used in the following examples.

Figure 6:
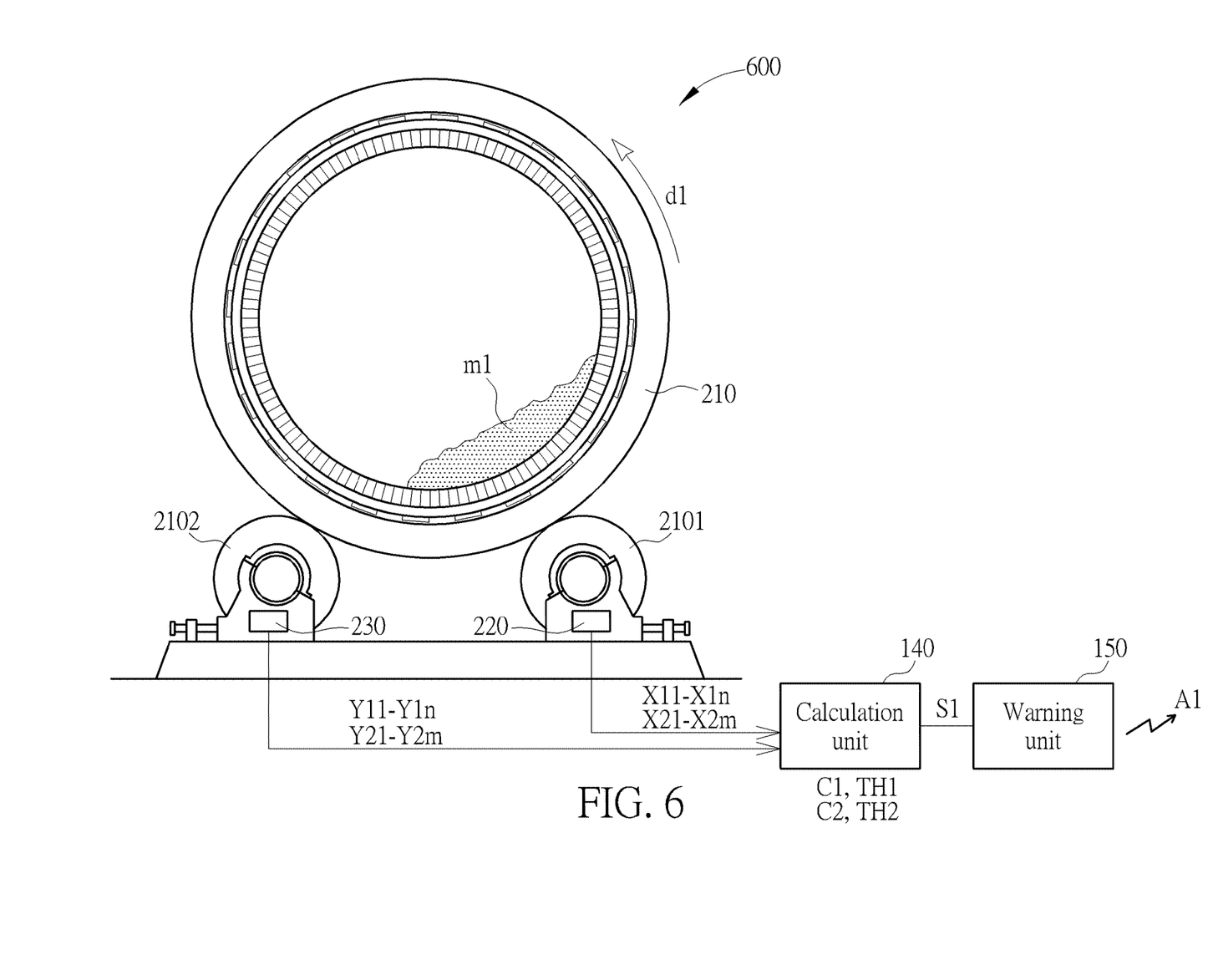
FIG. 6 illustrates an early warning system applied on the cement rotary kiln according to an embodiment.

FIG. 6 illustrates an early warning system 600 applied on the cement rotary kiln 210 according to an embodiment. The early warning system 600 may be similar to the early warning system 200 of FIG. 3, so the identical components are not described repeatedly. In FIG. 6, the first temperature measurement unit 220 may obtain a third set of temperature data that is the third set of data X21-X2m. The second temperature measurement unit 230 may obtain a fourth set of temperature data that is the fourth set of data Y21-Y2m. Similar to the description of FIG. 5, the correlation coefficient C1 may be obtained according to the first set of data X11-X1n and the second set of data Y11-Y1n, and the correlation coefficient C2 may be obtained according to the third set of data X21-X2m and the fourth set of data Y21-Y2m. If the first period T1 is seven days, and the second period is 24 hours, and C1≤TH1, it may be interpreted that the forces on the rotary rollers 2101 and 2102 are uneven during the last seven days since the correlation between the variations of the temperatures of the two rotary rollers is too low. If C2≤TH2, it may be interpreted that the forces on the rotary rollers 2101 and 2102 are still uneven during the last 24 hours since the correlation between the variations of the temperatures of the two rotary rollers is still too low. Hence, when C1≤TH1 and C2≤TH2, the warning unit 150 may send the warning signal A1 to inform a user to perform standard operating procedures (SoP) to check the equipment, perform an emergency shutdown or slow down the speed of the equipment. The foresaid first threshold value TH1 and second threshold value TH2 may be set as (but not limited to) TH1=−0.2 and TH2=−0.15.

Figure 7:
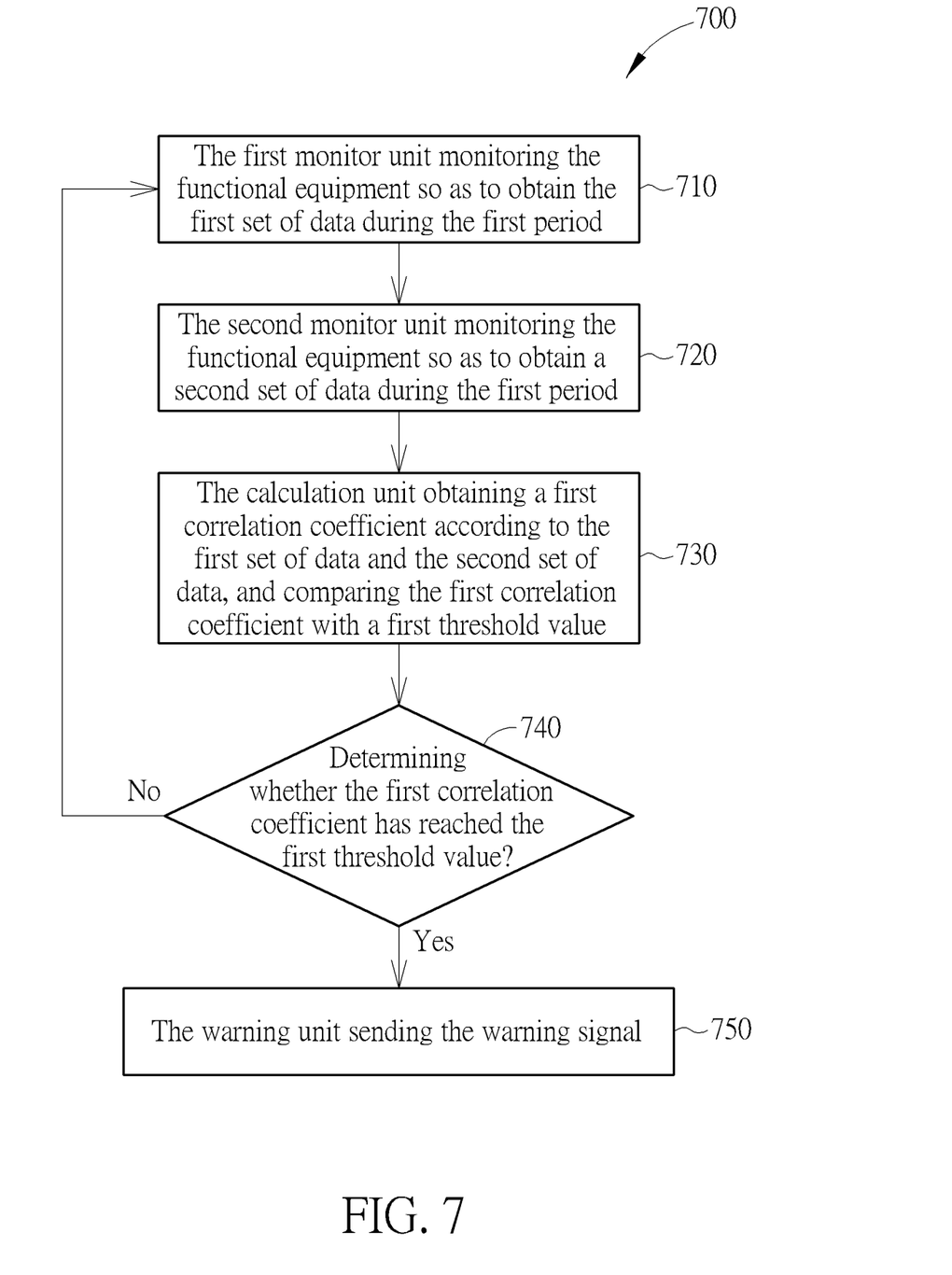
FIG. 7 illustrates a flowchart of a control method according to an embodiment.

FIG. 7 illustrates a flowchart of a control method 700 according to an embodiment. Referring to FIG. 1 and FIG. 7, the control method 700 may include:

Step 710: the first monitor unit 120 monitoring the functional equipment 110 so as to obtain the first set of data X11-X1n during the first period T1;

Step 720: the second monitor unit 130 monitoring the functional equipment 110 so as to obtain a second set of data Y11-Y1n during the first period T1;

Step 730: the calculation unit 140 obtaining a first correlation coefficient C1 according to the first set of data X11-X1n and the second set of data Y11-Y1n, and comparing the first correlation coefficient C1 with a first threshold value TH1;

Step 740: determining whether the first correlation coefficient C1 has reached the first threshold value TH1; if so, entering Step 750, else, entering Step 710; and Step 750: the warning unit 150 sending the warning signal A1.

The flow in FIG. 7 may correspond to FIG. 1 or FIG. 3, and an embodiment of generating a correlation coefficient to be compared with a threshold vale. The details are described above, so it is not repeated.

Figure 8:
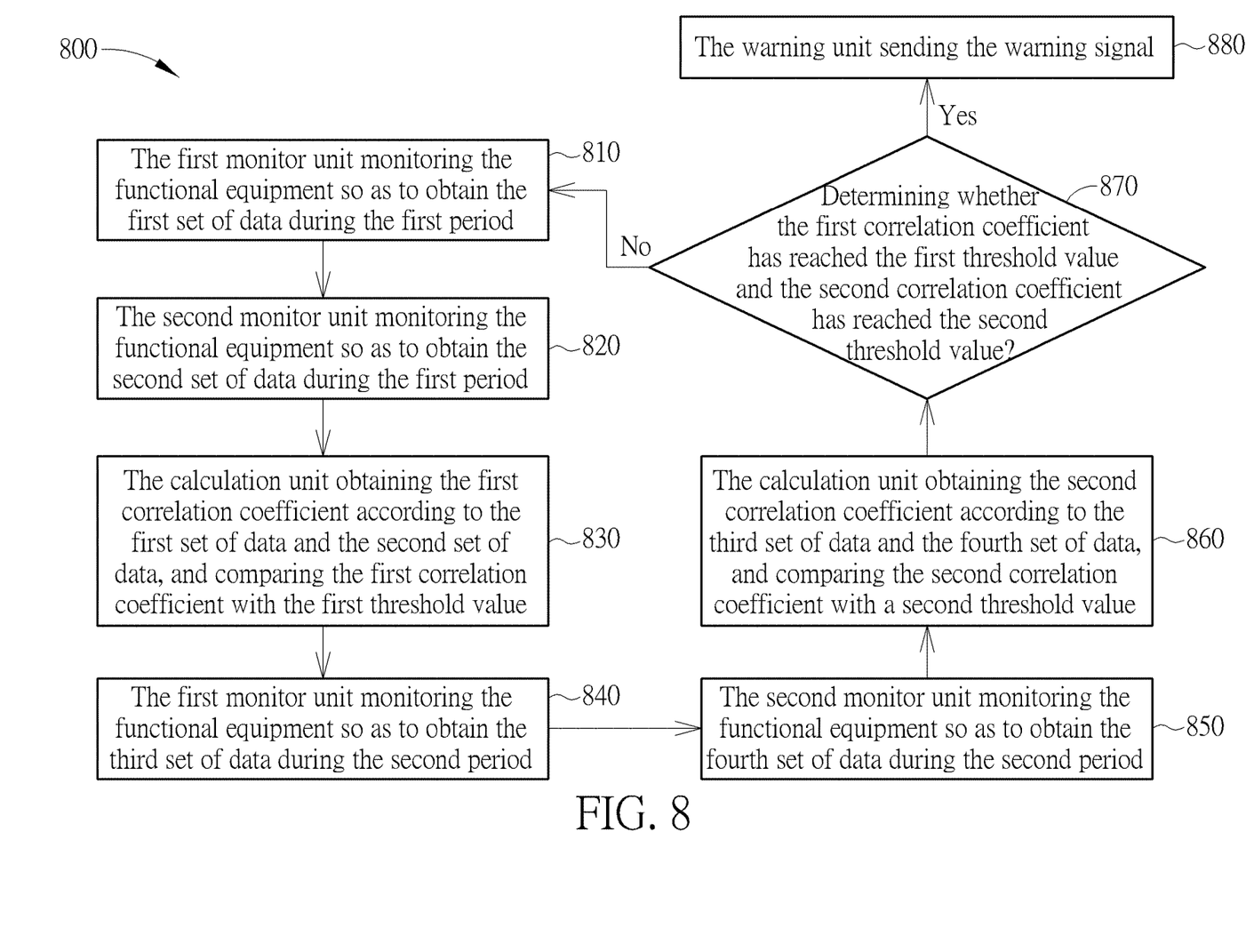
FIG. 8 illustrates a control method according to an embodiment.

FIG. 8 illustrates a control method 800 according to an embodiment. Referring to FIG. 5 and FIG. 8, the control method 800 may include:

Step 810: the first monitor unit 120 monitoring the functional equipment 110 so as to obtain the first set of data X11-X1n during the first period T1;

Step 820: the second monitor unit 130 monitoring the functional equipment 110 so as to obtain the second set of data Y11-Y1n during the first period T1;

Step 830: the calculation unit 140 obtaining the first correlation coefficient C1 according to the first set of data X11-X1n and the second set of data Y11-Y1n, and comparing the first correlation coefficient C1 with the first threshold value TH1;

Step 840: the first monitor unit 120 monitoring the functional equipment 110 so as to obtain the third set of data X21-X2m during the second period T2;

Step 850: the second monitor unit 130 monitoring the functional equipment 110 so as to obtain the fourth set of data Y21-Y2m during the second period T2;

Step 860: the calculation unit 140 obtaining the second correlation coefficient C2 according to the third set of data X21-X2m and the fourth set of data Y21-Y2m, and comparing the second correlation coefficient C2 with a second threshold value TH2; and Step 870: determining whether the first correlation coefficient C1 has reached the first threshold value TH1 and the second correlation coefficient C2 has reached the second threshold value TH2; if so, entering Step 880, else, entering Step 810; and Step 880: the warning unit 150 sending the warning signal A1.

The flow in FIG. 8 may correspond to FIG. 5 or FIG. 6, and an embodiment of generating a first correlation coefficient and a second first correlation coefficient, and sending a warning signal when the first correlation coefficient reaches the first threshold value and the second correlation coefficient reaches the second threshold value. The details are described above, so it is not repeated.

Figure 9:
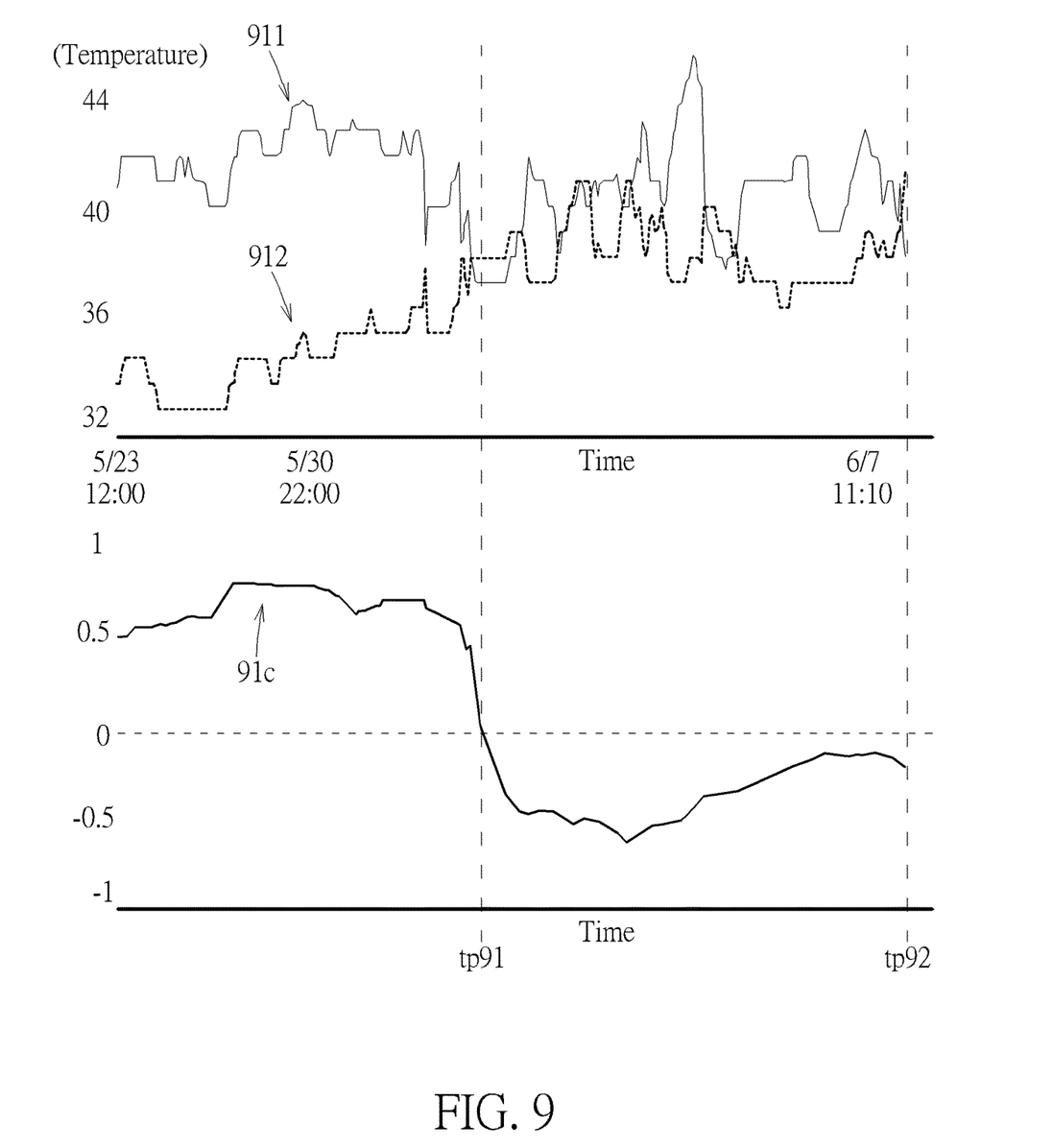
FIG. 9 illustrates comparison between curves of the measured data and the first correlation coefficient according to an embodiment.

FIG. 9 illustrates comparison between curves of the measured data and the first correlation coefficient C1 according to an embodiment. In FIG. 9, the curve diagrams are drawn using data generated by processing raw data collected from a real case. The curves 911 and 912 may be temperature data measured using the first temperature measurement unit 220 and the second temperature measurement unit 230 of FIG. 3. The curve 91c may correspond to the first correlation coefficient C1 obtained accordingly. As the curve 91c shows, the first correlation coefficient C1 was changed from a positive value to a negative value at the time point tp91. In this example, the equipment broke down at the time point tp92. The time point tp91 was seven day earlier than the time point tp92. Hence, it is possible to send a warning signal several days (e.g. seven days) before the malfunction of the equipment according to an embodiment. The early warning provides workers sufficient time to respond to a potential damage caused by overheating the equipment, and prevents the equipment from breaking down due to uneven forces on a pair of rotary rollers even though their temperatures are within acceptable ranges.

In summary, an early warning system and a control method provided according embodiments of the present invention may be used to send a warning by analyzing measured data before an abnormal malfunction occurs so that problems of the field may be effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An early warning system for detecting an abnormal condition when no excessive temperature is measured, comprising:
   functional equipment configured to perform a functional operation;
   a first monitor unit configured to monitor the functional equipment so as to obtain a first set of data during a first period;
   a second monitor unit configured to monitor the functional equipment so as to obtain a second set of data during the first period;
   a calculation unit linked to the first monitor unit and the second monitor unit and configured to receive at least the first set of data and the second set of data, obtain a first correlation coefficient according to the first set of data and the second set of data, and compare the first correlation coefficient with a first threshold value; and
   a warning unit linked to the calculation unit and configured to send a warning signal when at least the first correlation coefficient is lower than the first threshold value;
   wherein when the first set of data and the second set of data are more positively correlated, the first correlation coefficient has a higher value;
   wherein the functional equipment is a cement rotary kiln, the functional operation is heating cement material, the first monitor unit is a first temperature measurement unit, the second monitor unit is a second temperature measurement unit, the first set of data is a first set of temperature data, the second set of data is a second set of temperature data, the warning unit includes a display interface and/or a speaker, and the warning signal includes a visual signal and/or a voice signal.

2. The early warning system of claim 1, wherein the first correlation coefficient is obtained by performing calculation of a function using the first set
   of temperature data, a mean value of the first set of temperature data, the second set of temperature data, and a mean value of the second set of temperature data.

3. The early warning system of claim 1, wherein:
   the first monitor unit is further configured to obtain a third set of data during a second period;
   the second monitor unit is further configured to obtain a fourth set of data during the second period;
   the calculation unit is further configured to receive the third set of data and the fourth set of data, obtain a second correlation coefficient according to the third set of data and the fourth set of data, and compare the second correlation coefficient with a second threshold value; and
   the warning unit is configured to send the warning signal when the first correlation coefficient drops is lower than the first threshold value and the second correlation coefficient drops is lower than the second threshold value;
   wherein when the third set of data and the fourth set of data are more positively correlated, the second correlation coefficient has a higher value.

4. The early warning system of claim 3, the third set of data is a third set of temperature data, the fourth set of data is a fourth set of temperature data, the warning unit includes a display interface and/or a speaker, and the warning signal includes a visual signal and/or a voice signal.

5. The early warning system of claim 4, wherein:
   the first correlation coefficient is obtained by performing calculation of a first function using the first set of temperature data, a mean value of the first set of temperature data, the second set of temperature data, and a mean value of the second set of temperature data; and
   the second correlation coefficient is obtained by performing calculation of a second function using the third set of temperature data, a mean value of the third set of temperature data, the fourth set of temperature data, and a mean value of the fourth set of temperature data.

6. The early warning system of claim 5, wherein the first function and the second function are identical.

7. A method for controlling an early warning system for detecting an abnormal condition when no excessive temperature is measured, the early warning system comprising functional equipment, a first monitor unit, a second monitor unit, a calculation unit and a warning unit, the method comprising:
   the functional equipment performing a functional operation;
   the first monitor unit monitoring the functional equipment so as to obtain a first set of data during a first period;
   the second monitor unit monitoring the functional equipment so as to obtain a second set of data during the first period;
   the calculation unit obtaining a first correlation coefficient according to the first set of data and the second set of data, and comparing the first correlation coefficient with a first threshold value; and
   the warning unit sending a warning signal when the first correlation coefficient drops is lower than a first threshold value;
   wherein when the first set of data and the second set of data are more positively correlated, the first correlation coefficient has a higher value;
   wherein the functional equipment is a cement rotary kiln, the functional operation is heating cement material, the first monitor unit is a first temperature measurement unit, the second monitor unit is a second temperature measurement unit, the first set of data is a first set of temperature data, the second set of data is a second set of temperature data, the warning unit includes a display interface and/or a speaker, and the warning signal includes a visual signal and/or a voice signal.

8. A method for controlling an early warning system for detecting an abnormal condition when no excessive temperature is measured, the early warning system comprising functional equipment, a first monitor unit, a second monitor unit, a calculation unit and a warning unit, the method comprising: the functional equipment performing a functional operation;
   the first monitor unit monitoring the functional equipment so as to obtain a first set of data during a first period;
   the second monitor unit monitoring the functional equipment so as to obtain a second set of data during the first period;

the calculation unit obtaining a first correlation coefficient according to the first set of data and the second set of data, and comparing the first correlation coefficient with a first threshold value;

the first monitor unit monitoring the functional equipment so as to obtain a third set of data during a second period;

the second monitor unit monitoring the functional equipment so as to obtain a fourth set of data during the second period; the calculation unit obtaining a second correlation coefficient according to the third set of data and the fourth set of data, and comparing the second correlation coefficient with a second threshold value;

and the warning unit sending the warning signal when the first correlation coefficient drops is lower than the first threshold value and the second correlation coefficient drops is lower than the second threshold value;

wherein when the first set of data and the second set of data are more positively correlated, the first correlation coefficient has a higher value, and when the third set of data and the fourth set of data are more positively correlated, the second correlation coefficient has a higher value;

wherein the functional equipment is a cement rotary kiln, the functional operation is heating cement material, the first monitor unit is a first temperature measurement unit, the second monitor unit is a 10 second temperature measurement unit, the first set of data is a first set of temperature data, the second set of data is a second set of temperature data, the third set of data is a third set of temperature data, the fourth set of data is a fourth set of temperature data, the warning unit includes a display interface and/or a speaker device, and the warning signal includes a visual signal and/or a voice signal.

* * * * *